United States Patent [19]

Kaneko

[11] Patent Number: 4,993,852
[45] Date of Patent: Feb. 19, 1991

[54] PRINT HEAD CONTROL FOR SUBSCRIPT AND SUPERSCRIPT CORRECTION

[75] Inventor: Naohisa Kaneko, Nagoya, Japan

[73] Assignee: Brother Kogyo Kabushiki Kaisha, Japan

[21] Appl. No.: 442,491

[22] Filed: Nov. 27, 1989

Related U.S. Application Data

[63] Continuation of Ser. No. 179,058, Apr. 8, 1988, abandoned.

[30] Foreign Application Priority Data

Apr. 9, 1987 [JP] Japan .................................. 62-88245

[51] Int. Cl.$^5$ ............................................ B41J 29/36
[52] U.S. Cl. ...................................... 400/63; 400/695; 400/904
[58] Field of Search ................ 400/63, 74, 695–697.1, 400/904

[56] References Cited

U.S. PATENT DOCUMENTS

| | | | |
|---|---|---|---|
| 3,780,846 | 12/1973 | Kolpek | 400/697.1 |
| 4,629,341 | 12/1986 | Brinkmann et al. | 400/76 |
| 4,648,047 | 3/1987 | Berkland | 400/904 |
| 4,820,063 | 4/1989 | Mori | 400/279 |

FOREIGN PATENT DOCUMENTS

| | | | |
|---|---|---|---|
| 0044667A1 | 4/1982 | European Pat. Off. | 400/17 |
| 0154139A3 | 7/1985 | European Pat. Off. | 400/904 |
| 2021831A | 12/1979 | United Kingdom | 400/17 |

OTHER PUBLICATIONS

IBM Technical Disclosure Bulletin, vol. 29, No. 6, Nov. 1986, p. 2561.

Primary Examiner—David A. Wiecking
Assistant Examiner—Steven S. Kelley
Attorney, Agent, or Firm—Kane, Dalsimer, Sullivan, Kurucz, Levy, Eisele and Richard

[57] ABSTRACT

Disclosed is a text processing system such as a word processor and an electronic typewriter. The disclosed system comprises memory means for storing character data and shift data indicating a character be printed on a line shifted upward or downward from a standard print line. Control means is operated to move a print head along the standard print line when a space or backspace key is operated, but is not operated to feed a print sheet even when the shift data are stored in the memory means for a character on which the print head is currently positioned.

12 Claims, 4 Drawing Sheets

PRIOR ART

PRINT HEAD CONTROL FOR SUBSCRIPT AND SUPERSCRIPT CORRECTION

This is a continuation of co-pending application Ser. No. 179,058 filed on Apr. 8, 1988, abandoned.

BACKGROUND OF THE INVENTION

This invention relates to a text processing system such as electronic typewriters and word precessors, particularly equipped with means for erasing characters which have been erroneously printed on a print sheet.

Some of the conventional text processing system are provided with character erasing means for erasing erroneously printed characters. The said character erasing means include a correction buffer for storing data of respective characters printed on the print sheet by operation of character keys. The correction buffer may also store shift data indicating that characters be printed on a shifted line parallel to the standard print line with a predetermined interval. Generally, such shift data is inputted when a superscript key or a subscript key is operated.

Figure 5:
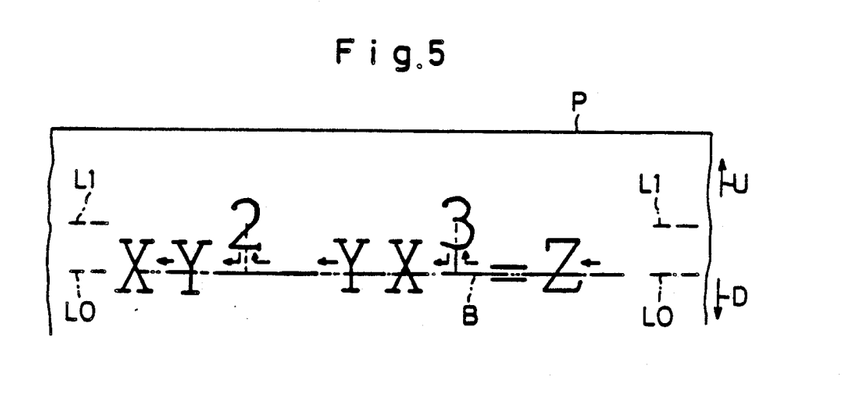
FIG. 5 illustrates an example of a series of print characters including superscripts, with indication of straight travel path of the carriage during the backward movement, in accordance with the prior art typewriter.

FIG. 5 illustrates a manner in which an equation of "$XY^2 - YX^3 = Z$" is printed with the conventional typewriter equipped with the correction buffer described above. More particularly, after characters "X" and "Y" are sequentially inputted by operation of corresponding character keys, a superscript key and a character key designating a figure "2" are sequentially operated to print the superscript "2" on the superscript print line $L_1$. Then, a subscript key is operated to return the print head to the standard print line and correspondng keys are operated to print "-", "Y" and "X" on the standard print line $L_0$. The superscript key and the figure "3" key are then sequentially operated to print a superscript "3". Finally, the subscript key is operated to return the printing head to the standard print line $L_0$ on which "=" and "Z" are successively input.

As appeared from the above explanation, the superscript and subscript keys are used to drive a line feed mechanism or a platen which feeds a print sheet P in directions U and D, respectively. Thus, the characters or symbols "X", "Y", "-", "Y", "X", "=" and "Z" are printed on the standard print line $L_0$, while the superscripts "2" and ""3" are printed on the shifted superscript print line $L_1$ spaced by half a line apart from the standard print line $L_0$. The respective character data and shift data are inputted to the correction buffer in response to each operation of the character key and the shift key including superscript and subscript keys.

Provided that "X" of "$XY^2$" has been erroneously printed and should be replaced by another character, which is found after the entire printing operation of this equation is completed. To carry out correction of the misprinted character "X", it is required to return the print head to the position of "X" by repeated operation of a backspace key, and after deletion of the mistypewritten character "X" and insertion of another desired character at the same position, the print head is moved to the print position next to the character "Z" by repeated operation of a space key, so that the typewriter will become ready for the succeeding printing operation.

These backward and forward movements of the print head required before and after the correction operation will be controlled by the character data and the shift data stored in the correction buffer, and the print head is moved just along the path B traveling during the initial printing operation. For example, when the backspace key is operated at the time the print head is positioned on "=", in response to the subscript shift data and character data both stored in the correction buffer for the subscript number "3", the print head is moved back along the standard print line $L_0$, and immediately thereafter the print sheet P is fed in the direction D so that the print head is positioned just above the figure "3" printed on the superscript print line $L_1$. When the backspace key is operated once more, likewise, the print head is moved to a position juxtaposed on "X" responsive to the superscript shift data and the character data stored in the correction buffer by moving the print head one character back and by feeding the print sheet P in the direction U. Also, during the forward movement of the printing head after erasure of "X" and printing of another character, the line feed mechanism is caused to drive responsive to the subscript shift data stored in the correction buffer for the figure "3" and the print head is moved forward just along the path B traveling during the initial printing operation.

Consequently, the correction operation carried out with the conventional typewriters inevitably includes the steps of feeding the print sheet when the superscript or subscript has been printed between the current carriage position and the position of the character to be erased. Such paper feeding step will not be inherently required in order to erase the character printed on the same print line on which the print head is now located. As a result, the print sheet P has been very likely to be displaced from the correct print line during such backward and forward movements of the print head, under the influence of backlash of gears of the line feed mechanism. To prevent the influence of backlash of the gears, an additional control program for controlling the sheet feed should be provided. A complicated control program and an increased storage capacity for the correction program have been required for driving the line feed mechanism in accordance with the shift data stored in the correction buffer.

SUMMARY OF THE INVENTION

It is therefore an object of the invention to provide an improved text processing system capable of performing erasing or correction operation without the necessity of feeding a print sheet each time the print head is moved forward or backward even when there has been printed superscript or subscript characters.

Another object of the invention is to provide a text processing system with a less complicated control program and least possible storage capacity.

To achieve these objects, according to the invention, there is provided a text processing system comprising a print head for printing characters on a print sheet in response to character data; print head driving means for reciprocating the print head along a print line on the print sheet; line feed means for feeding the print sheet in directions perpendicular to the print line; first input means for inputting the character data; second input means for inputting shift data for operating the line feed means to print characters on a line shifted from a standard print line; third input means for generating a print head reciprocating signal to energize the print head driving means; first memory means for storing the character data and the shift data for each character printed; control means for controlling the print head drive means in response to the print head reciprocating signal such that the print head is moved just along the standard print line even when the shift data has been stored in the first memory means.

With the above constructed system, when a print head moving signal instructing that the print head be moved in reverse is generated by the third input means after some characters including superscripts and/or subscripts have been printed, the control means is so operated as to move the print head in reverse just along the standard print line, without tracing the travel path of the print head during the initial printing operation. Similarly, the print head is moved forward just along the standard print line in response to another print head moving signal instructing that the print head be moved forward, while not effecting the line feed means. Since there is no need to feed the print sheet during the backward and forward movements of the print head, resulting in no need to provide with a program for controlling the sheet feeding, the print head can be promptly moved to a desired position by the control means through simplified control programs.

BRIEF DESCRIPTION OF THE ACCOMPANYING DRAWINGS

These and other objects and characteristic features of the invention will be understood from the following description of the embodiment when read in conjunction with the accompanying drawings in which.

DESCRIPTION OF THE EMBODIMENT

Figure 1:
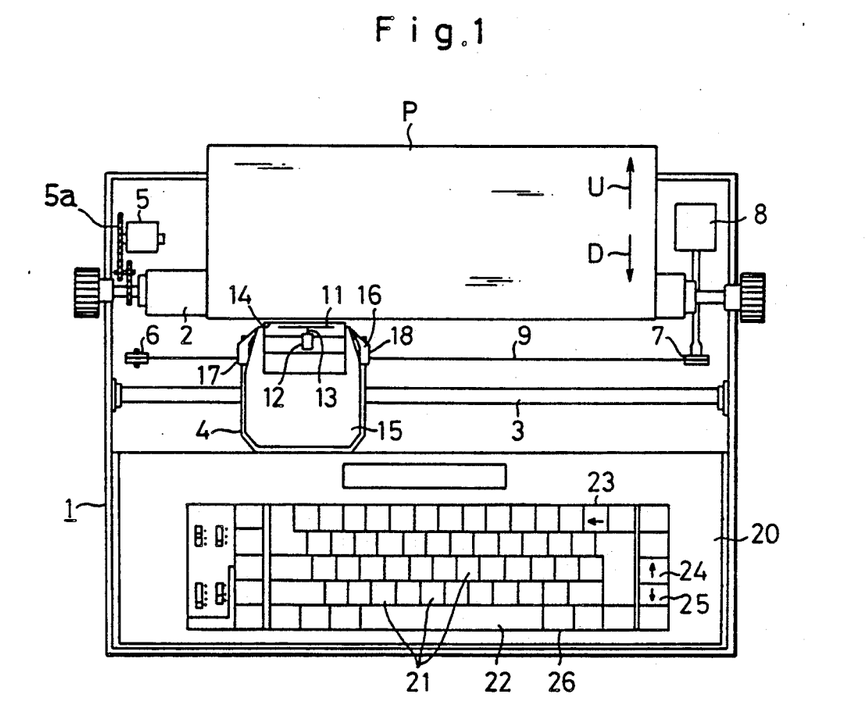
FIG. 1 is a plan view of an electronic typewriter embodying the invention.

FIG. 1 illustrates an electronic typewriter embodying the invention. A platen 2 for feeding a print sheet P is bridged over a frame 1 of the typewriter. A carriage 4 is reciprocally supported by a guide shaft 3 and a guide rail (not shown) extending parallel with the platen 2. The platen 2 may be rotated in opposite directions by a line feed motor (LF motor) consisting of a step motor 5 via a gear mechanism 5a to feed the print sheet P in forward and backward directions U and D, thereby changing the print line. Thus, the line feed mechanism is constituted by the platen 2, line feed motor 5 and gear mechanism 5a.

A pair of pulleys 6 and 7 are arranged near the opposite ends of the platen 2. These pulleys are connected by an endless wire 9 having a definite portion in engagement with the carriage 4. One pulley 7 is connected to a carriage drive motor (CA motor) 8 consisting of a step motor. Thus, the carriage 4 is moved forward to the right by the CA motor 8 rotating in forward direction, while it is moved backward to the left when the CA motor 8 rotates in reverse, both along the guide shaft 3. The carriage 4 may be reciprocated between the predetermined left and right end positions. The initial print position or left margin position of the carriage 4 may be set on the print line at any position rightward of the predetermined left end position, and the final print position or right margin position may be set at any position leftward of the predetermined right end position. These left and right margin positions may be changed by manual operation:

To the output shaft of a type-wheel select motor (WH motor) 10 (FIG. 2) mounted on the carriage 4 is secured a daisy wheel 11 with a plurality of type elements (not shown) provided on its outer circumference. The carriage 4 is equipped with a print hammer solenoid 12 which operates to cause a print hammer 13 to strike a selective one of the type elements. The print head is thus made up of the daisy wheel 11, print hammer solenoid 12, print hammer 13 and associated components.

A print ribbon 14 housed in a cassette 15 is carried by a ribbon holder (not shown) supported by the carriage 4. The print ribbon 14 is partially exposed between the platen 2 and the daisy wheel 11 and can be wound up by a well-known print ribbon take-up mechanism (not shown) in accordance with the reciprocal movement of the carriage 4.

On either side of the ribbon holder is provided a pair of spools 17 and 18 between which a correction ribbon 16 is wound. The correction ribbon 16 is located to travel between the platen 2 and the daisy wheel 11 underneath the print ribbon 14 and can be wound up by a known correction ribbon take-up mechanism (not shown) in drive connection with the take-up spool 18 in response to the movement of the ribbon holder.

The ribbon holder can be swung up and down in response to the action of a holder rocking motor 19 (FIG. 2) mounted on the carriage 4 by way of a well-known cam mechanism (not shown). Through this rocking movement of the ribbon holder, the print ribbon 14 and the correction ribbon 16 are oppositely located in print position and thus can be struck by the print hammer 13, through the type element to be corrected.

A keyboard 20 is furnished with character keys 21 for inputting character data, a space key 22 and a backspace key 23 for moving the carriage 4 and the print head along the print line, a superscript key 24 serving as one of print line shift keys for specifying the print position shifted half a line upward in a forward direction U normal to the print line, a subscript key 25 serving as another print line shift key for specifying the print position shifted half a line downward in a backward direction D normal to the print line, and a correction key 26 for instructing erasure of a printed character by means of the correction ribbon 16 in accordance with the data stored in the correction buffer.

Figure 2:
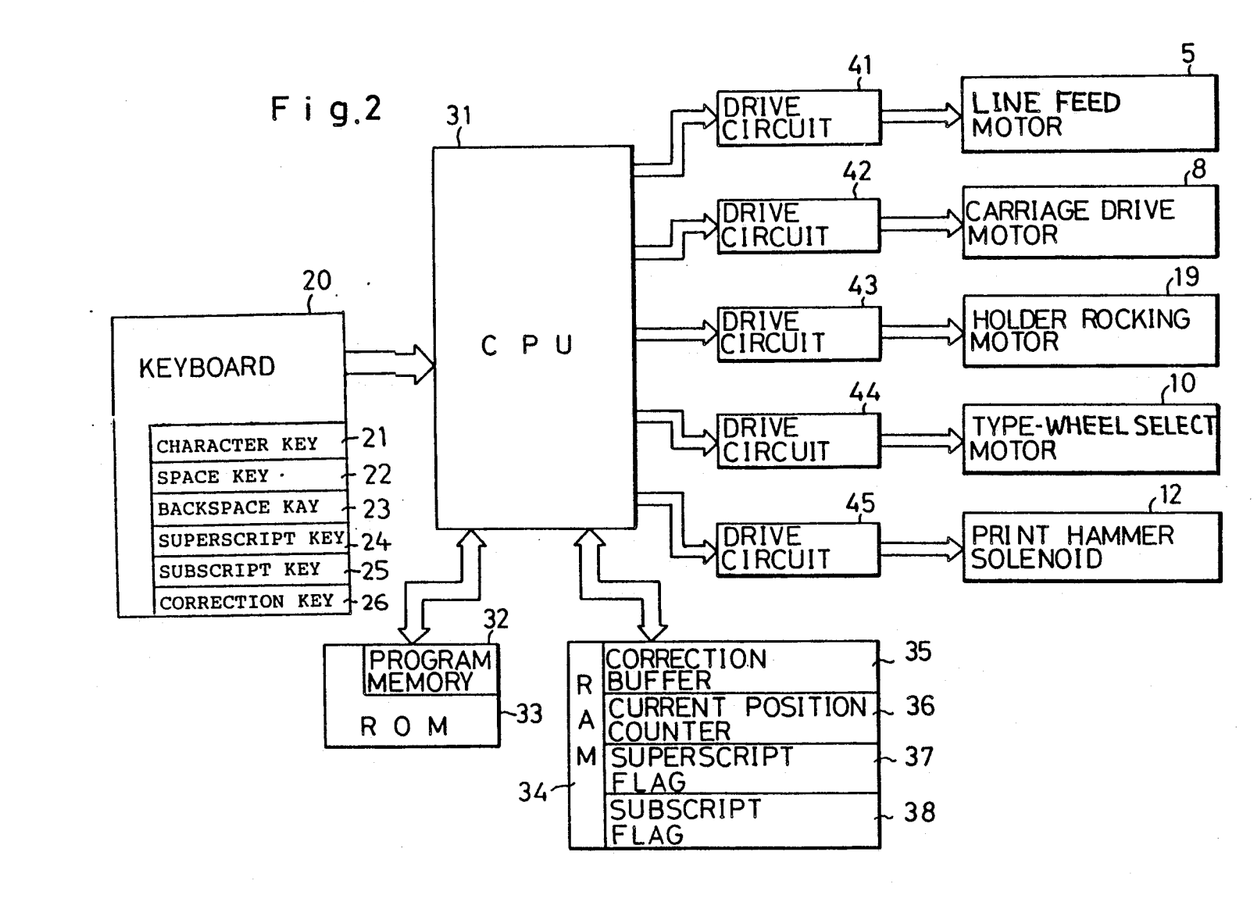
FIG. 2 is a block diagram of electric constitution of the typewriter.

Now the electric configuration of the electronic typewriter as above arranged will be described below with reference to a block diagram shown in FIG. 2.

To control means which comprises in this embodiment a central processing unit (CPU) 31 is connected a read only memory (ROM) 33 provided with a program memory 32 storing control program, and a random access memory (RAM) 34 including several memories for temporarily storing the operation result of CPU 31. CPU 31 controls character printing and erasing operations in accordance with the control program stored in the program memory 32. CPU 31 also controls print sheet feeding (line feed) operation, reciprocal movement of the carriage 4 and other operations in accordance with the control program.

RAM 34 includes a correction buffer 35 capable of storing print data corresponding in number to the characters printed on one print line on the print sheet P. The print data consist of two bytes (16 bits), the higher one of which is assigned character data representing the printed characters. The lower one byte is assigned attribute data incidental to the character data, which comprise, for example, shift data representing the upward and downward shift positions specified by the superscript key 24 and subscript key 24, underline data indicating presence or absence of underlines, and carriage stroke data for moving the print head to the next print position along the print line.

A current position counter 36 in RAM 34 will count the horizontal position data indicating the carriage position along the print line, namely a distance from the left end position, which is changed by reciprocal movement of the carriage 4. The vertical position data indicating whether the horizontal print position is on the standard print line $L_0$ or on a line shifted upward or downward therefrom (see FIG. 4) are also stored in RAM 34. More particularly, if the character is printed on the superscript print line $L_1$ (FIG. 3) spaced half a line upward from the standard print line $L_0$, a superscript flag 37 is made ON. In case of the subscript character, a subscript flag 38 become ON. The horizontal position data is constituted by 1 byte (8 bits) and the vertical position data by two bits.

CPU 31 is connected at its input to the keyboard 20 and at its output to the LF motor 5, CA motor 8, WH motor 10, print hammer solenoid 12 and holder rocking motor 19, via respective drive curcuits 41 to 45.

When one of the character key 21 is depressed by an operator, CPU 31 is operated in response to the character data inputted by the character key, to drive the WH motor 10 to place a corresponding type element of the daisy wheel 11 in opposition to the print hammer 13. It then allows the print hammer solenoid 12 to be energized to strike the type element with the print hammer 13, so that the desired character is printed in the predetermined print position on the print sheet P by way of the print ribbon 14. After printing one character, the CA motor 8 is driven to move forward the carriage by one character pitch. At this time, the character data and carriage stroke data are stored in the correction buffer 35 in RAM 34.

Provided that the superscript key 24 is operated, CPU 31 turns ON the superscript flag 37, which in turn drive the LF motor 5 to feed the print sheet P in the rearward direction D. Then, any one of the character keys 21 is operated to print the corresponding character on the superscript print line $L_1$. After the superscript character has been thus printed, CPU 31 feeds the print sheet P in the forward direction U to return the print sheet P to the initial position to align the carriage 4 with the standard print line $L_0$. At the same time, CPU 31 turns OFF the superscript flag 37. On the contrary, CPU 31 is operated in response to the subscript flag 38 being ON to drive the LF motor 5 to feed the print sheet P in the forward direction U. After one character has been printed on the subscript print line $L_2$, CPU 31 then sends the print sheet P in the rearward direction D to return the print sheet P to the initial position, and turns OFF the subscript flag 38.

In such operation, the character data and shift data entered by the keys 21, 24 and 25 are successively stored in the correction buffer 35. The horizontal position data representing the current carriage position along the print line are counted by the current position counter 36 each time the key is operated. The vertical position data indicating the carriage position currently standing on the superscript or subscript print line are, in turn, stored in the superscript and subscript flags 37, 38.

Furthermore, CPU 31 reads out of the correction buffer 35 the character data and shift data for the character to be erased, when a correction signal is inputted by depression of the correction key 26. The holder rocking motor 19, WH motor 10, print hammer solenoid 12 and LF motor 5 are then driven in accordance with these character data and shift data. Accordingly, the correction ribbon 16 is placed in the print position, and the type element corresponding to the character to be erased is located in opposition to the print hammer 13, so that the type element is struck by the hammer 13 to erase the character by means of the correction ribbon 16. At the same time, CPU 31 clears the character data and attribute data for the erased character from the correction buffer 35.

When a forward moving signal is inputted by the space key 22 after the correction operation has been completed, CPU 31 reads out the vertical and horizontal position data representing the current carriage position, the former being read out from the superscript and subscript flags 37, 38, and the latter from the current position counter 36. If the vertical position data stored in flags 37, 38 indicate the carriage now positioned on the superscript or subscript line $L_1$ or $L_2$, the LF motor 5 is driven to feed the print sheet P in the forward or backward direction U or D to move the carriage 4 from the currently standing shifted line to the standard print line $L_0$. Such carriage position returning operation is generally required when the superscript key 24 or subscript key 25 is operated not followed by operation of any character key 21 to be printed on the superscript or subscript print line, in which case the carriage is not automatically returned to the standard print line and therefore still positioned on the shifted line. With the carriage position moved to the standard print line $L_0$, CPU 31 shifts the horizontal position data one character ahead and in accordance with the carriage stroke data stored in the correction buffer 35 in a position corresponding to the current carriage position, and causes the CA motor 8 to move the carriage 4 forward by one character pitch that is determined by the said carriage stroke data.

If the horizontal position data of the carriage read out from the current position counter 36 at the time when the forward moving signal is inputted, reprsenting that the carriage mow stands at the right end position or at the right margin position, no carriage moving operation is carried out. Alternatively, CPU 31 in this case commands that certain error processing operation be effected such as halting the CA motor 8, which is not described in more detail because it does not concern the material features of the invention.

On the contrary, when a return signal is inputted by the backspace key 23, CPU 31 reads out the horizontal and vertical position data from the current position counter 36 and the flags 37, 38 respectively. If the carriage current position is not on the standard print line $L_0$, the platen is rotated in the direction U or D so that the carriage is aligned with the standard print line $L_0$. After that, CPU 31 shifts the horizontal position data one character back and in accordance with the carriage storke data stored in the correction buffer 35 in a position one back to the left of the current carraige position, and causes the CA motor 8 to move the carriage in reverse by one character pitch that is determined by the said carriage stroke data. In case the horizontal position data read out from the correction buffer 35 represents that the carriage 4 is positioned at the right end position or at the right margin position, CPU 31 commands that a certain error processing be performed.

Figure 3:
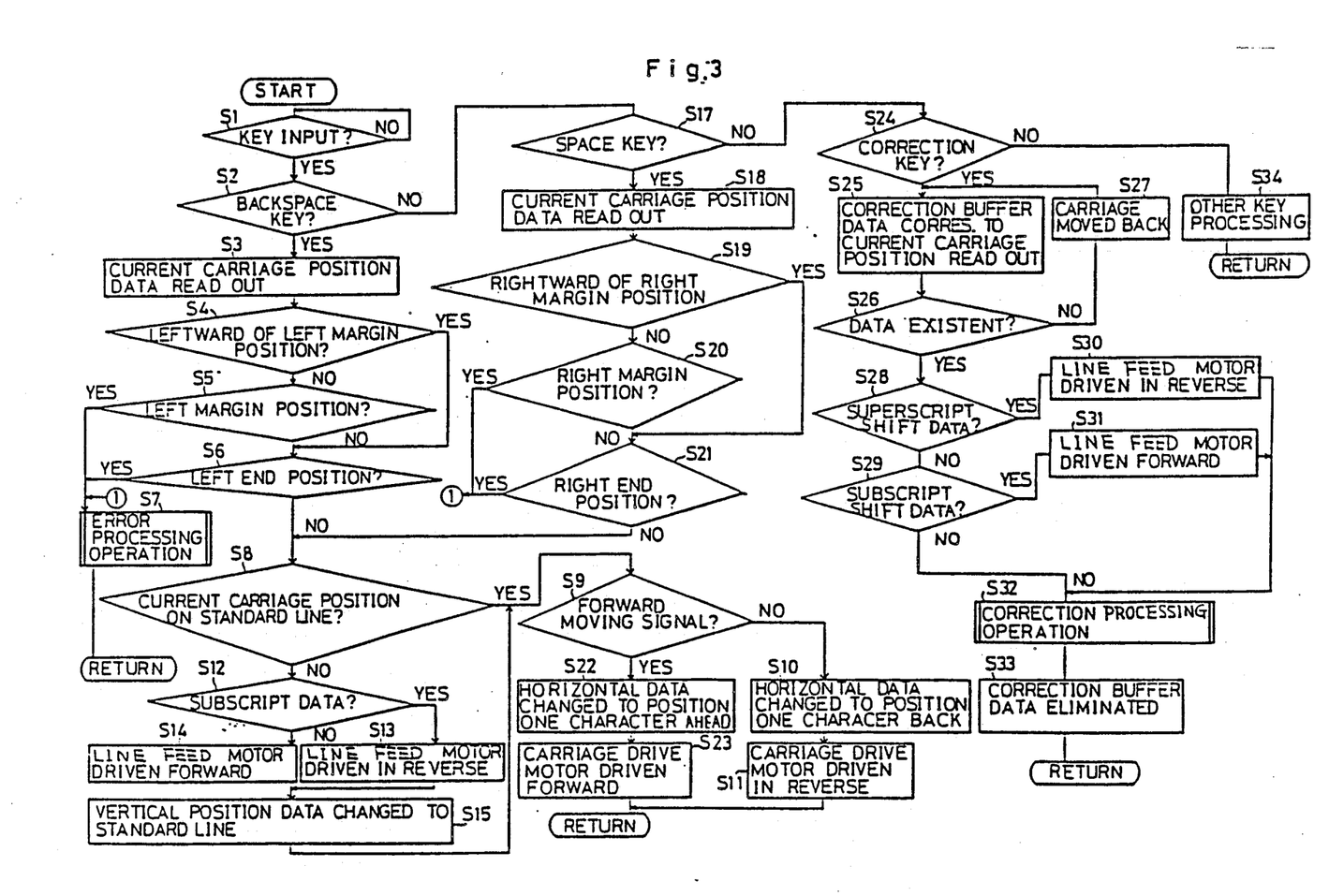
FIG. 3 is a flow chart of key processing control routines including carriage movements along the print line and correction operation.

The operation of the electronic typewriter as above constructed is now described with reference to the flow chart of FIG. 3 and also to FIG. 4.

Figure 4:
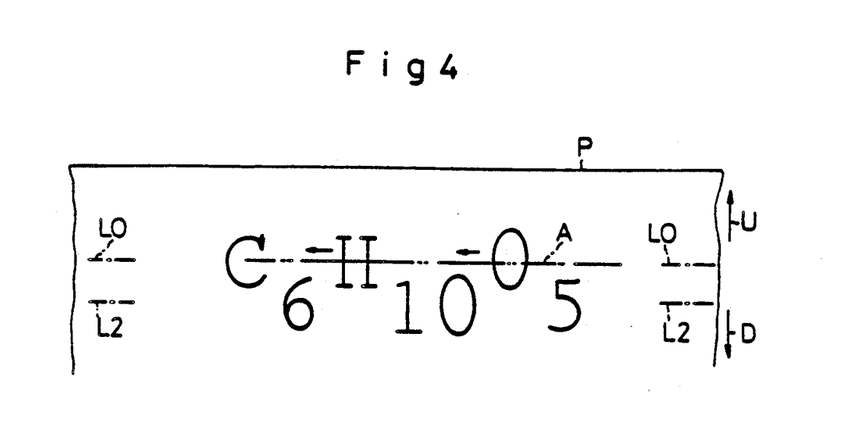
FIG. 4 illustrates an example of print characters including subscripts, with indication of travel path of the carriage during the backward movement, in accordance with the typewriter shown in FIGS. 1 to 3.

Exemplary explanation will be given to printing operation for characters and numbers of the chemical formula "$C_6H_{10}O_5$" on a print sheet P as shown in FIG. 4. To print this chemical formula, the character key 21 of "C" is first operated. Then the subscript key 25 is depressed followed by operation of the "6" number key 21. Then the "H" character key 21 is operated. After operating the subscript key 25, the "1" number key 21 is operated and again the subscript key 25 and then the "0" number key 21 are successively operated so that the subscript "10" is printed. Then the "O" character key 21 is depressed. Finally, the subscript key 25 and the "5" number key 21 are successively operated. Thus, by operating the character keys 21 and the subscript key 25, the characters "C", "H" and "O" are printed along the standard print line $L_0$ on the print sheet P, while the subscript numbers "6", "10" and "5" are printed along the print line $L_2$ spaced half a line down from the standard print line $L_0$ and accompanies the respective characters. After the chemical formula "$C_6H_{10}O_5$" has been completely printed on the print sheet P, the carriage 4 is automatically forwarded to the next print position on the standared print line $L_0$ one character ahead of the number "5" printed on the subscript print line $L_2$.

The character data representing the chemical formula "$C_6H_{10}O_5$" and the subscript shift data have been stored in the correction buffer 35 in response to each key operation. The current position counter 36 have counted the horizontal position data indicating the current carriage position along the print line. The vertical position data indicating the current carriage position in a direction perpendicular to the print line are stored in the flag 37, 38, and in this case the subscript data has been stored in the subscript flag 38 at the carriage position existing on the subscript numbers "6", "1", "0" and "5" respectively.

Now provided that the character "C" in the chemical formula "$C_6H_{10}O_5$" has been errouneouly printed and should be corrected to another character, which is found immediately after printing the entire characters and numbers representing this chemical formula. Reference should now be made to the flow chart in FIG. 3. In this case, the backspace key 23 is operated once so that the step S1 (herein referred to as simply S1, as for all other steps) and S2 each outputs the discrimination result YES. In S3, CPU 31 reads out from RAM 34 the horizontal and vertical position data representing the current carriage position which is located on the standard print line $L_0$ one character ahead of the subscript number "5". CPU 31 in S4 to S6 then discriminates whether the carriage 4 is located at the left margin position or the left end position, in dependence on the horizontal position data stored in the current position counter 36. If the carriage 4 is found at the left margin position or the left end position, CPU 31 effects in S7 a certain error processing operation.

Because the carriage 4 is in this instance neither at the left margin position nor at the left end position, CPU 31 steps up to S8 where it discriminates whether the carriage 4 is now positioned on the standard print line $L_0$ in accordance with the vertical position data stored in the superscript flag 37 or subscript flag 38.

Since the current carriage position is on the standard print line $L_0$, CPU 31 is operated in S9 to discriminate whether a forward moving signal is generated by operation of the space key 22 or alternatively rearward moving signal is generated by the backspace key 23. Because the signal comprises the rearward moving signal in this instance, operation goes to S10 where the horizontal position data at the current position counter 36 is changed to the position one character back in accordance with the carriage stroke data stored in the correction buffer 35 for the character printed one character back to the left, and further goes to S11 to turn in reverse the CA motor 8 by a certain amount that determined by the said carriage stroke data. Consequently, the carriage 4 is moved backward by one character and positioned just above the printed subscript number "5".

If S8 determines that the current carriage position is not set on the standard print line $L_0$, operation goes to S12 which discriminates whether the vertical position data stored in the superscript or subscript flag 37, 38 is a downward shift data or an upward shift data. If the vertical position data comprises a downward shift data, CPU 31 operates in S13 to rotate the LF motor 5 in reverse in a certain amount to set the print position to the standard print line $L_0$. Thus, the print sheet P is traveled in the backward direction D by half a line to place the carriage on the standard print line $L_0$. If there is an upward shift data included in the vertical position data, CPU 31 goes to S14 where the LF motor 5 is turned in the forward direction by a certain amount to set the carriage on the standard print line $L_0$. CPU 31 further proceeds from S13 or S14 to S15 where the vertical position data at the current position counter 36 is changed to the standard print line position in accordance with the processing in S13 or S14, so that the flag 37, 38 is turned OFF. CPU 31 then goes to S9.

When the backspace key 23 is operated further six times, CPU 31 repeats the processes from S1 to S11 so that only the CA motor 8 is driven to move back the carriage 4 along the travel path A on the standard print line $L_0$, as shown in FIG. 4, to finally position the carriage 4 in opposition to the printed character "C". The LF motor 5 is not driven and therefore the print sheet P is in no way fed during the backward movement of the carriage 4.

When the correction key 26 is operated at the time the carriage is positioned just above the character "C", through S1, S2, S17 and S24, CPU 31 reads out in S25 the data stored in the correction buffer 35 for the character "C". In case there is no data stored in the correction buffer 35 for the character corresponding to the current carriage position, CPU 31 commands that the carriage 4 be moved one more character back in S27, and the operation returns to S25. With the data read out from the correction buffer 35, the correction processing operation is performed in S28 to S33. More particularly, CPU 31 discriminates whether the shift data are stored in the correction buffer 35 for the character on which the carriage is now positioned, in S28 and S29 respectively. In case the superscript shift data is stored, in S30 the LF motor 5 is driven to feed the print sheet P in the rearward direction D to align the carriage with the superscript print line $L_1$, while in response to the subscript shift data the step proceeds to S31 where CPU 31 causes the LF motor 5 to feed the print sheet P in the forward direction U so that the carriage 4 is positioned just above the subscript character. Then, a certain correction processing operation is performed by the correction ribbon 16 in S32 in dependence with the data stored in the correction buffer 35 for the character to be erased. Turning to the example shown in FIG. 4, since the character "C" is printed on the standard print line $L_0$, the certain correction operation is effected in S32, while not driving the LF motor 5. After that, the data having been stored for the erased character "C" are eliminated from the correction buffer 35.

Then, a character key 21 is operated to print a desired character which is to be printed at the position corresponding to the erased character "C". CPU 31 goes via S1, S2, S17, S24 to S34 where the various data are input to RAM 34 as in the usual manner described before. The character data inputted by the character key 21 operated are stored in the correction buffer 35. The selected print pitch is also stored in the correction buffer 35 as the carriage stroke data, and at the same time the carriage is moved forward a distance corresponding to the said print pitch to become ready for the next print operation.

When the space key 22 is operated to move the carriage position to the right after correction operation for the character "C" has been completed, CPU 31 goes via S1 and S2 to S17 where YES is outputted. In S18, CPU 31 reads out the horizontal and vertical position data representing the current carriage position from the current position counter 36 and the flags 37, 38 respectively. CPU in S19 to S21 then discriminates whether the carriage 4 is located in the right margin position or at the right end position in dependence on the horizontal position data. If the carriage 4 is found in the right margin position or at the right end position, CPU 31 jumps to S7 to effect a certain error processing operation.

Because the carriage 4 is in this instance neither in the right margin position nor at the right end position, CPU 31 goes to S8 where it discriminates whether the carriage 4 is positioned on the standard print line $L_0$ in accordance with the vertical position data stored in the flag 37, 38. Since the current position in this instance exists on the standard print line $L_0$, CPU 31 jumps to S9 to discriminate whether there is an entry of a forward moving signal by operation of the space key 22. CPU 31 then proceeds to S22 where the horizontal position data at the current position counter 36 is changed to the position one character ahead in dependence with the carriage stroke data stored in the correction buffer 35 for the character on which the carriage is now positioned, and further goes to S23 to turn the CA motor 8 forward by a certain amount that determined by the said carriage stroke data. Consequently, the carriage 4 is moved forward by one character.

While the space key 22 is then operated repeatedly until the carriage reaches a position next to the subscript number "5" on the standard print line $L_0$, CPU 31 drives only the CA motor 8 without operating the LF motor 5. As a result, the print sheet P is not being fed, while only the carriage 4 is moving forward along the travel path A on the standard print line $L_0$.

Where the subscript character, for example "6" in the chemical formula "$C_6H_{10}O_5$" shown in FIG. 4, is to be replaced by another character, from the current carriage position on the standard print line $L_0$ at the print position next to the subscript number "5", the back-space key 23 is depressed six times so that the operations from S1 to S11 are repeated six times. Thus, the carriage 4 is moved to the left to the print position corresponding to the subscript character "6" but positioned on the standard print line $L_0$. Then, the correction key 26 is operated so that the operation goes via S1, S2, S17, S24, S25 and S26 to the correction processing operations in S28 to S33. Since the subscript shift data is stored in the correction buffer 35 for the character "6", CPU 31 discriminates such a result in S29 and then causes the LF motor 5 to feed the print sheet P in the forward direction U, thereby allowing the carriage 4 to align with the subscript print line $L_2$ in S31. Then, the subscript "6" is erased in S32 and the data in the correction buffer 35 are eliminated in S33.

It will be appreciated that where a superscript character is to be erased, the above explanation will also be applied except that S28 and S30 are effected in place of S29 and S31. In response to the superscript shift data discriminated in S30 the platen 2 is caused to rotate in the reverse direction D so that the carriage 4 is positioned on the superscript line $L_1$ and therefore become ready for erasure operation for the superscript character in S32.

It will be understood that according to the invention, while the carriage moving operation along the print line is performed in response to operation of the space or backspace key, the shift data indicating that the character be printed not along the standard print line is not be read out from the correction buffer. Accordingly, the print sheet is prevented from slipping out of position along the print line during the carriage reciprocating operation. Further, there is no need of providing a control program which commands that the platen drive motor be driven in response to the shift data stored in the correction buffer 35 when the space or backspace key is operated to move forward or rearward the carriage, resulting in reduced mass for the control program in CPU and reduced storage capacity of RAM.

Although the invention has been described in conjunction with a specific embodiment some examples, it should be understood that many modifications and variations may be made without departing from the spirit and scope of the invention as defined in the appended claims. For example, while according to the embodiment described, the carriage is automatically returned to the standard print line $L_0$ after operation of the superscript or subscript key followed by of any character key, CPU may be so operated that the carriage is returned only after the subscript or superscript key is operated, as described in connection with the prior art referring to FIG. 5.

What is claimed is:

1. A text processing system having erasing capabilities and for printing regular characters intermixed with subscripts and superscripts, said system comprising:
   a print head for printing characters on a print sheet in response to character data;
   print head driving means for reciprocating said print head along a print line on the print sheet;
   line feed means for feeding the print sheet in directions perpendicular to the print line in response to shift data for printing and erasing one of a subscript or superscript;
   first input means for inputting said character data;
   second input means for inputting said shift data for operating said line feed means to print characters on a line shifted from a standard print line;

third input means for generating a print head reciprocating signal to energize said print head driving means;

first memory means for storing said character data and said shift data for each character to be printed;

character correction means operated in response to operation of a correction key to erase a character which has been erroneously printed;

control means responsive to said character correction means for (1) controlling said print head drive means in response to said print head reciprocating signal such that said print head is driven by said print head driving means to be reciprocally moved to any desired inputted character position on said standard print line character position by character position just along the standard print line even when said shift data has been stored in said first memory means and (2) for controlling said line feed means to respond to shift data.

2. The text processing system according to claim 1 wherein said second input means comprises superscript and subscript keys arranged for printing superscripts and subscripts on the shifted print line.

3. The text processing system according to claim 1 wherein said third input means comprises space and backspace keys arranged for moving forward and backward said print head along the print line.

4. The text processing system according to claim 1 which further comprises second memory means for storing horizontal position data representing a current position of said print head along the print line, and third memory means for storing vertical position data representing current position of said print head existing on the shifted line.

5. The text processing system according to claim 4 wherein said control means is operated in response to said vertical position data stored in said third memory means to effect said line feed means, thereby positioning said print head to align with the standard print line, when said print head is positioned on the shifted line at a time said print head reciprocating signal is generated from said third input means.

6. The text processing system according to claim 4 wherein said control means is operated in response to said horizontal position data to command an error processing operation, when said print head is positioned at a margin at a time said print head reciprocating signal is generated from said third input means.

7. The text processing system according to claim 1 wherein said control means is operated in response to operation of said correction key to read out said character data and said shift data stored in said first memory means for the character to be erased.

8. The text processing system according to claim 7 wherein said control means drive said line feed means to align said print head with the shifted line when said read-out shift data indicate that the character to be erased has been printed on said shifted line.

9. A text processing system for printing regular characters intermixed with shifted characters, said system comprising:

a print head for printing characters on a print sheet in response to character data;

print head driving means for reciprocating said print head along a print line on the print sheet;

line feed means for feeding the print sheet in directions perpendicular to the print line;

first input means for inputting said character data;

second input means for inputing shift data for operating said line feed means to print characters on a line shifted from a standard print line;

memory means for storing at least said character data and said shift data for each character to be printed and the data relating to a reciprocal movement of said print head;

judging means for judging whether at least one shift data has been stored in said memory means;

first control means for controlling said print head drive means and said line feed means so as to drive said print head character position by character position based upon the shift data and said data relating to a reciprocal movement of said print head stored in said memory means; and second control means for controlling said print head drive means so as to reciprocally drive said print head character position by character position to any desired inputted character position along said standard print line regardless of the shift data having been stored in said memory means even when it is judged by said judge means that the shift data are stored is said memory means.

10. A text processing system in accordance with claim 9 wherein said second control means comprises a back space key provided with said input means.

11. A text processing system in accordance with claim 9 further comprising character correction means for erasing a character which has been erroneously printed in accordance with an operation of said first control means, said character correction means being operated in response to an operation of a correction key provided with said second input means.

12. A text processing system in accordance with claim 9 wherein a memory area in said memory means corresponding to one character is arranged to include at least two byte areas, one of said byte areas storing the character codes to be printed and the other of said byte areas storing the shift data and the data relating to a reciprocal movement of said print head.

* * * * *